United States Patent
Hayasaka

[11] Patent Number: 5,845,142
[45] Date of Patent: Dec. 1, 1998

[54] PORTABLE TERMINAL TO CONTROL COMMUNICATION BASED ON RESIDUAL BATTERY CAPACITY

[75] Inventor: Hisashi Hayasaka, Kawasaki, Japan

[73] Assignee: Fujitsu Limited, Kawasaki, Japan

[21] Appl. No.: 921,337

[22] Filed: Aug. 29, 1997

Related U.S. Application Data

[63] Continuation of Ser. No. 613,076, Mar. 8, 1996, abandoned, which is a continuation of Ser. No. 84,473, Jul. 1, 1993, abandoned.

[30] Foreign Application Priority Data

Aug. 21, 1992 [JP] Japan ......................................... 222587

[51] Int. Cl.⁶ ................................ G06F 1/26; G06F 1/32
[52] U.S. Cl. ............................... 395/750.08; 395/750.06; 364/707
[58] Field of Search ..................... 395/750.08, 750.06, 395/750.03; 364/707, 492

[56] References Cited

U.S. PATENT DOCUMENTS

| | | | |
|---|---|---|---|
| 4,907,183 | 3/1990 | Tanaka | 364/707 |
| 4,949,046 | 8/1990 | Seyfang | 324/427 |
| 4,984,185 | 1/1991 | Saito | 364/707 |
| 5,167,024 | 11/1992 | Smith et al. | 395/375 |
| 5,230,074 | 7/1993 | Canova, Jr. et al. | 395/750 |

FOREIGN PATENT DOCUMENTS

| | | |
|---|---|---|
| 1-188918 | 7/1989 | Japan . |
| 1-191913 | 8/1989 | Japan . |
| 2-27413 | 1/1990 | Japan . |

*Primary Examiner*—Gopal C. Ray
*Attorney, Agent, or Firm*—Staas & Halsey

[57] ABSTRACT

In data communication with power furnished from a built-in battery, the residual battery capacity is detected as power that can be currently supplied by the battery. In addition, power necessary for communication is forecast from the quantity of data for communication. The currently residual battery capacity and the necessary power for communication are compared. If the former is in excess of the latter, the communication operation is allowed, while otherwise it is inhibited. When the communication operation is inhibited, functions of parts irrelevant to communication operation are suppressed or reduced. When function suppression is done, the necessary power for communication is re-forecast for comparison from current consumed by other parts than those functions suppressed or reduced.

14 Claims, 5 Drawing Sheets

PORTABLE TERMINAL TO CONTROL COMMUNICATION BASED ON RESIDUAL BATTERY CAPACITY

This application is a continuation of application Ser. No. 08/613,076, filed Mar. 8, 1996, now abandoned, which was a continuation of application Ser. No. 08/084,473, filed on Jul. 1, 1993, now abandoned.

BACKGROUND OF THE INVENTION

This invention relates to portable terminals for data communication with a host computer or the like by utilizing a telephone line and, more particularly, to a portable terminal, which is furnished with power from a built-in power supply battery for data communication operation.

With the recent spread of data communications and a trend for reducing terminal size, portable terminals with built-in communication functions are becoming popular. Most portable terminals have a built-in power supply battery so that they can be used in various places. In such battery driving, the battery capacity is limited, and therefore communication failure is probable when the battery capacity becomes less during the communication. Improvement in this respect has been demanded.

In a prior art portable terminal which is furnished with power from a built-in battery for operation, the residual battery capacity is detected and displayed to urge battery charging in order to avoid communication failure due to battery capacity shortage that might occur during communication. In addition, when the detected residual battery capacity becomes lower than a predetermined threshold value, an alarm indicates the battery capacity shortage to urge the battery charging. However, such a prior art portable terminal is capable of communication even with a battery capacity shortage. Therefore, the user may enter or be in communication without confirming the residual battery capacity or any alarm. In such a case, a communication failure is liable with the battery capacity becoming insufficient during communication.

SUMMARY OF THE INVENTION

This invention seeks to provide a portable terminal, which permits prevention of communication failure due to battery capacity shortage.

According to the invention, there is provided a portable terminal, which comprises a battery-operated communication unit. The terminal predicts power necessary for communication (i.e., power to be consumed) from the residual battery capacity, which is defined as power that can be currently supplied by the battery, and also from the communication data quantity. More specifically, the current residual battery capacity and the power necessary for communication are compared, and if the former surpasses the latter, the operation of communication is allowed. In the converse case, i.e., with the former being less than the latter, the communication operation is inhibited.

Further, when the communication operation is inhibited, a function of parts irrelevant to the communication operation is suppressed. Then, taking into account the power that would have been consumed by the parts irrelevant to communication, the power necessary for the communication is determined again and checked. Among the parts irrelevant to the communication operation are a floppy disk device, a display unit, an option slot connector, etc. The functions of these parts are stopped or reduced. When the functions are stopped or reduced locally, the parts with the functions thereof suppressed are displayed. Further, when the communication operation is inhibited, an alarm is produced. Further, when the communication operation is inhibited, communication control information, such as dial No., etc., and communication data are stored in a non-volatile memory. When the communication operation is allowed after battery charging, the communication control information and communication data stored in the non-volatile memory are read out for the communication operation.

Specifically, upon reception of a communication request, the current residual battery capacity and the power necessary for communication that is predicted from the communication data quantity are compared, whereby communication failure due to battery capacity shortage can be avoided. Further, by permitting the communication control information and communication data, which are stored, in the case of the communication operation inhibition due to the battery capacity shortage, in non-volatile memory backed up by an exclusive battery or the like and read out therefrom after the completion of battery charging, to be used to start a communication operation, automatic communication can be obtained without producing a new communication request. Further, even during communication the residual battery capacity and the necessary power for communication as predicted from the data quantity are compared, and if it is determined that the battery capacity is insufficient, the functions of the parts irrelevant to the communication operation are stopped or reduced, whereby current consumption in the system can be reduced to obtain a normal end of the communication operation. In this case, the function stoppage or reduction is displayed to prevent its misunderstanding as a failure.

The above and other objects, features and advantages of the present invention will become more fully apparent from the following detailed description of the preferred embodiment when the same is read with reference to the accompanying drawings.

DETAILED DESCRIPTION OF THE PREFERRED EMBODIMENT

Figure 1:
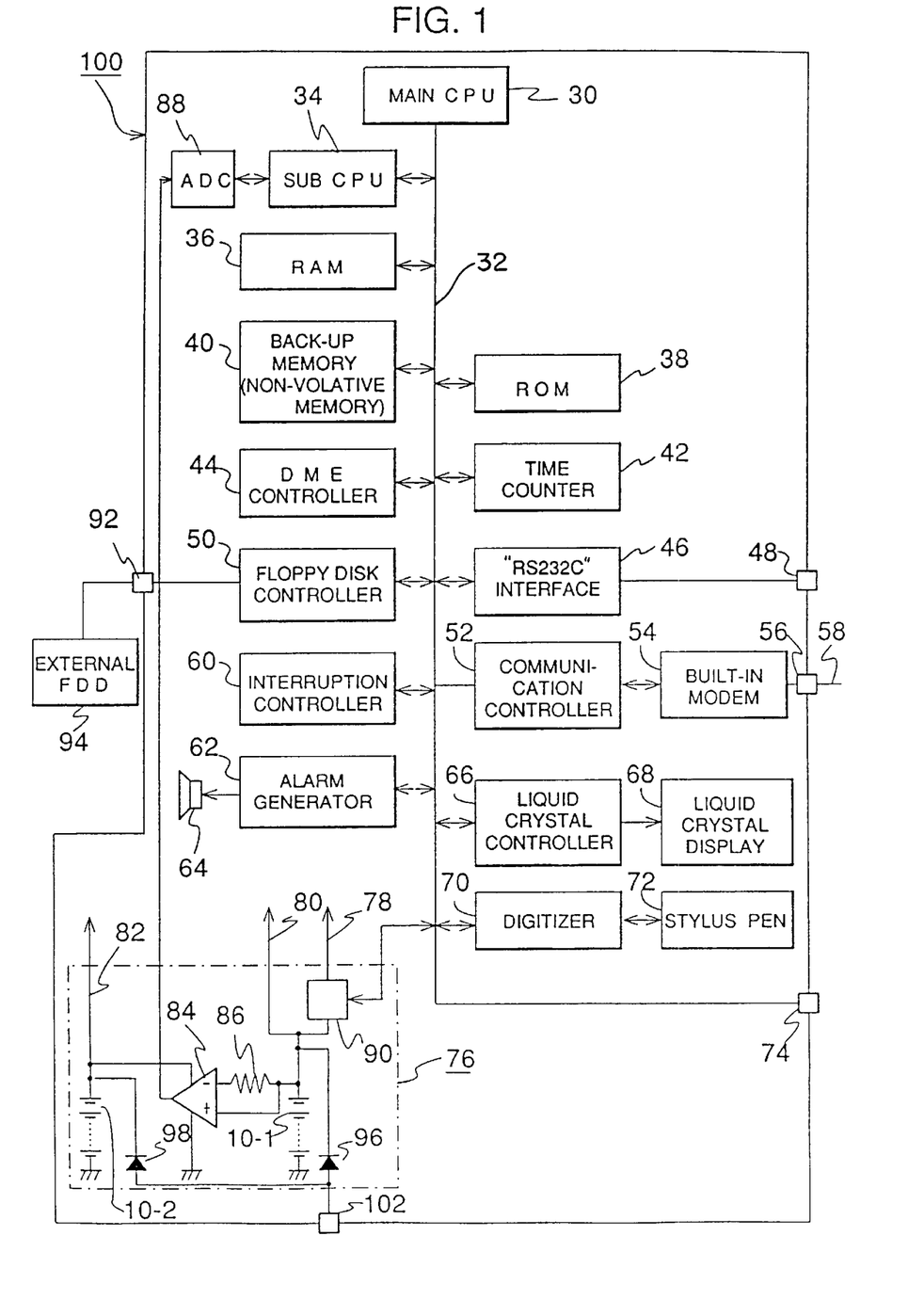
FIG. 1 is a block diagram showing a hardware structure according to the invention.

FIG. 1 shows an embodiment of the present invention. Generally designated at 100 is a portable terminal, which comprises a main CPU 30. From the main CPU 30 is led out a CPU bus 32 with a sub CPU 34 connected thereto. To the CPU bus 32 is also connected to a RAM 36, a ROM 38, a back-up memory 40 functioning as a non-volatile memory, a timer 42, a DMA controller 44, a "RS232C" interface 46 capable of connection via a connector 48 to an external modem or the like, a floppy controller 50 connected via a connector 92 to an external floppy disk device 94, a communication controller 52 with a built-in modem 54 for data communication with an external telephone line 58 via a connector 56, an interruption controller 60, an alarm generator 62 provided with a loudspeaker 64, a liquid crystal display controller 66 for controlling display on a liquid crystal display 68, and a digitizer 70 for detecting coordinate input from a stylus pen 72. The CPU bus 32 further has an expansion slot 74 for connecting an external option unit. The portable terminal 100 further comprises a power supply controller. In this embodiment, the power supply controller 76 includes a main battery 10-1 and a sub battery 10-2. The sub battery 10-2 is for power supply to the back-up memory 40 and timer 42 via a power supply line 82. The main battery 10-1, on the other hand, is for power supply to the floppy disk controller 50 and external floppy disk device via a switch circuit 90 and a power supply line 78. It further supplies power via a parallel power supply line 80 to all the other parts than the floppy disk controller 50, back-up memory 40 and timer 42.

The power supply to the floppy disk controller 50 and external floppy device 94 via the power supply line 78 can be on-off switched under the control of the main CPU 30. The power supply controller 76 further includes a differential amplifier 84. The plus terminal of the main battery 10-1 is connected directly to the plus input terminal of the differential amplifier 84 and connected to the minus input terminal thereof via a sense resistor 86. The differential amplifier 84 detects and outputs the battery voltage of the main battery 10-1. In the sense resistor 86, a constant weak current is flowing through the internal circuit of the operational amplifier 84, thus generating a potential difference proportional to the voltage of the main battery 10-1. The differential amplifier 84 detects the potential difference generated across the sense resistor 86 and outputs a corresponding voltage to an A/D converter 88. The battery voltage of the main battery 10-1 as detected by the differential amplifier 84 is converted in the A/D converter 88 into a digital signal which is taken in the sub CPU 34. A charging terminal 102 is connected via diodes 96 and 98 to the plus terminal side of the main battery 10-1 and sub battery 10-2. For charging the main and sub batteries 10-1 and 10-2, an AC adapter or an exclusive charger is connected to the charging terminal 102 to receive the supply of a rated DC voltage.

Figure 2:
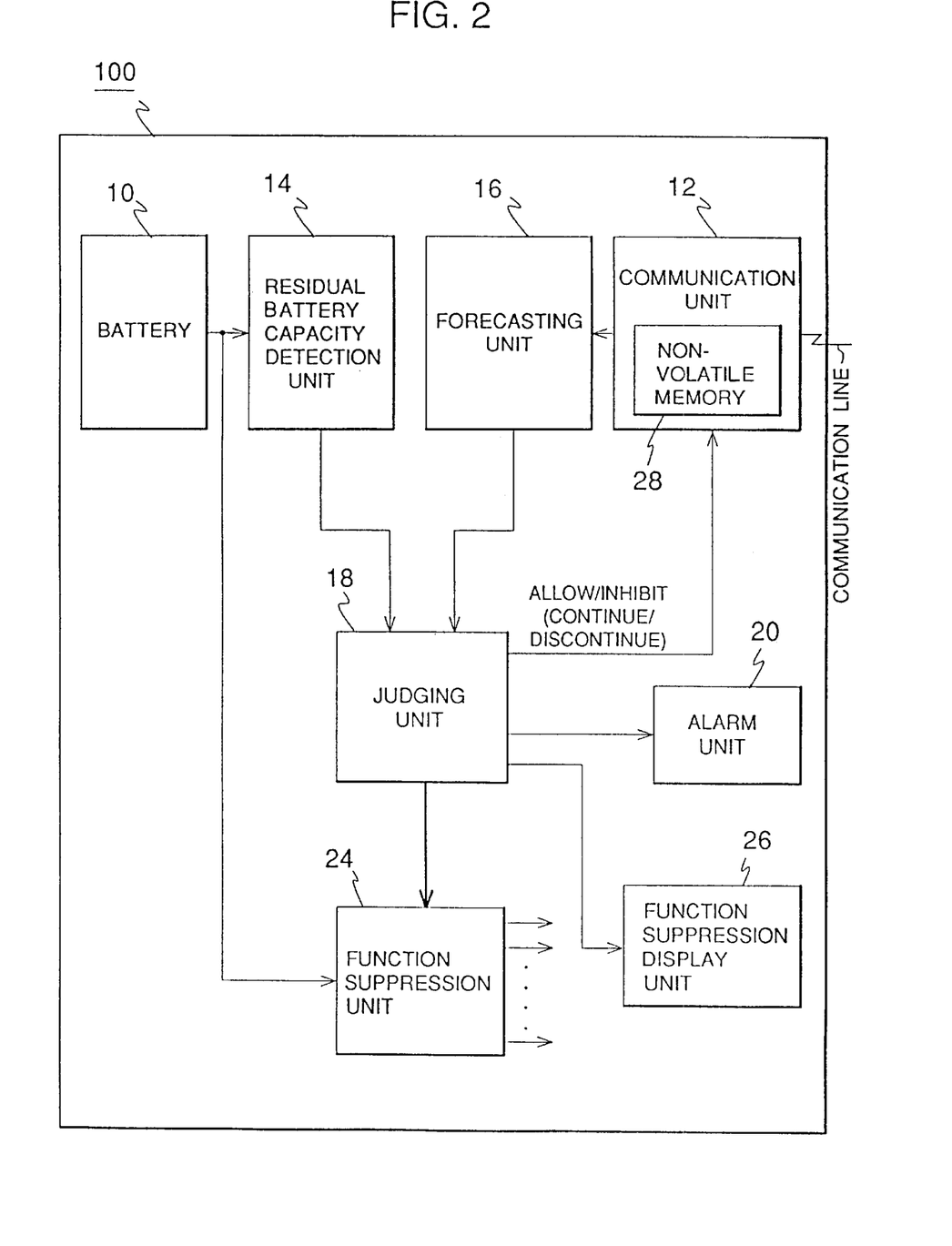
FIG. 2 is a block diagram showing the functions according to the invention.

FIG. 2 is a block diagram showing functions of the portable terminal 100 according to the invention. A battery 10 supplies drive power to a communication unit 12. A residual battery capacity detection unit 14 detects residual battery capacity as power, which can be currently supplied by the battery 10. A forecasting unit 16 forecasts power necessary for communication from the quantity of data for communication by the communication unit 12. A judging unit 18 compares the current residual battery capacity and the power necessary for communication. If the former is above the latter, the unit 18 allows the communication operation of the communication unit 12. Otherwise, it inhibits the communication operation. A function suppression unit 24 suppresses or reduces the functions of the parts irrelevant to the communication operation when the communication operation is inhibited by the judging unit 18. When the function suppression or reduction is done by the function suppression unit 24, the judging unit 18 newly detects the power necessary for communication from the current consumed in the other parts, i.e., the parts relevant to the communication operation and compares the detected power. When the function suppression or reduction is done by the function suppression unit 24, it is displayed on a function suppression display unit 26. Further, an alarm unit 20 alarms the inhibition of the communication operation. The communication unit 12 includes a non-volatile memory 28. When the communication operation is inhibited by the judging unit 18, communication control information, such as dial number, and communication data are stored in the non-volatile memory 28. When the the communication operation is subsequently allowed by the judging unit 18 after charging of the battery 10, the communication control information and communication data stored in the non-volatile memory 28 are read out for the communication operation. This function is provided during communication as well.

The correspondence between FIGS. 1 and 2 is as follows. The communication unit 12 is realized by program control by the main CPU 30. The residual battery capacity detection unit 14, forecasting unit 16 and judging unit 18 are realized by program control by the sub CPU 34. The sub CPU 34 is provided separately from the main CPU 30 in order that upon a user's communication request to the main CPU 30 it independently and concurrently detects the residual battery capacity, calculates the power necessary for communication from the communication data quantity and compares the residual battery capacity and the power necessary for communication so that the communication control in the main CPU 30 is allowed or inhibited according to the result of comparison. In addition, even while the main CPU 30 is executing communication control, the sub CPU 34 is detecting the residual battery capacity and forecasting and comparing the power necessary for communication of the residual quantity of data. Thus, it can judge the battery capacity shortage concurrently with the communication control by the main CPU 30.

The function of the alarm unit 20 is realized by the alarm generator 62 and loudspeaker 64. The function suppression unit 24 cuts power supply to the floppy disk controller 50 and external floppy disk device via the power supply line 78 by turning off the switch circuit 90 in the power supply controller 76. The function suppression display unit 26 is realized by the liquid crystal display controller 66 and liquid crystal display 68, and displays the suppression of the function of the external floppy disk device 94 with the turning-off of the switch circuit 90. The non-volatile memory 28 is realized by the back-up memory 40 which receives power supplied from the sub battery 10-2. When the sub CPU 34 inhibits a communication operation as a result of residual battery capacity judgment executed upon a communication request, the prevailing communication control information, e.g., dial No., and communication data are stored in the back-up memory 40 by the main CPU 30. When the communication control information and communication data are stored in the back-up memory 40, the main CPU 30 sets a re-dial flag. Then, in response to a subsequent re-dial operation after completion of the charging of the main battery 10-1, the stored communication control information and communication data are read out from the back-up memory 40, and communication is brought about automatically without need of a repeated communication request.

Figure 3:
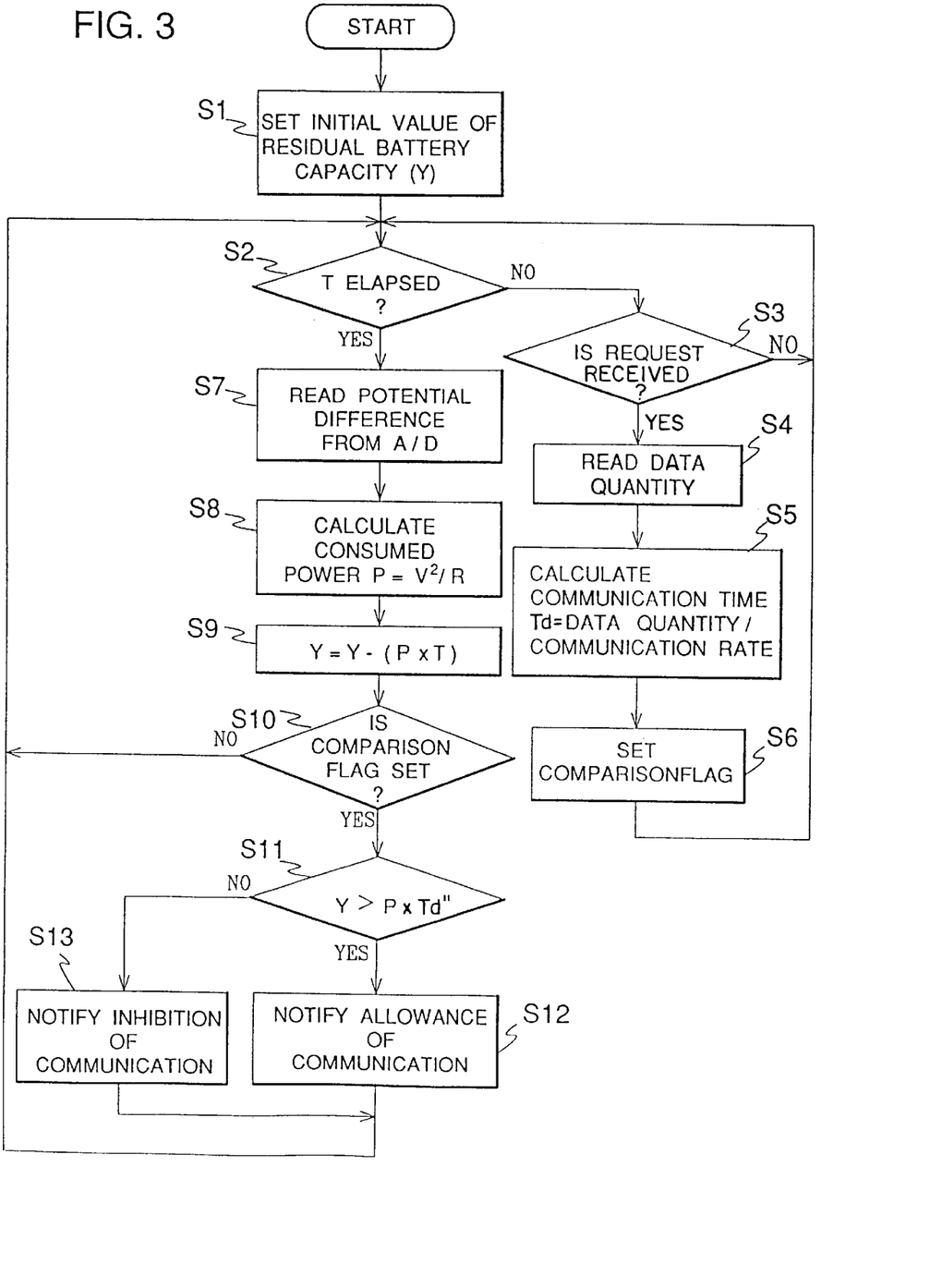
FIG. 3 is a flow chart illustrating a sub CPU routine of judging whether communication is possible from the residual battery capacity and the power necessary for communication

FIG. 3 is a flow chart illustrating a judging routine as to whether to allow or inhibit communication, which routine is executed by the sub CPU 34 in FIG. 1 according to the result of comparison between the residual battery capacity and the power necessary for communication. In a step S1, the sub CPU 34 sets an initial value Y of the capacity of the main battery 10-1 in the fully charged state thereof. Then, it monitors the lapse of a predetermined time T in a step S2.

Until the lapse of the time T it repeatedly checks for any user's communication request in a step S3. When a communication request is provided during the predetermined wait time T, the sub CPU 34 is informed of the communication request by the main CPU 30. As a result, a step S4 is executed, in which the sub CPU 34 reads the quantity of communication data informed from the main CPU 30, and in a subsequent step S5 it calculates communication time Td. The communication time Td is calculated by dividing the data quantity read out in the step S4 by a predetermined communication rate of data supplied from the built-in modem 54. In a subsequent step S6, the sub CPU 34 sets a comparison flag for execution of the comparison of the residual battery capacity and the power necessary for communication. The routine then returns to the step S2. If the lapse of the predetermined time T is detected in the step S2, the routine then goes to a step S7, in which the sub CPU 34 reads out the voltage of the main battery 10-1 from the A/D converter 88, and in a subsequent step S8 it calculates power P currently consumed from predetermined total load resistance R. In a subsequent step S9, it updates the residual battery capacity Y by subtracting the consumed power (T×P), i.e., the product of the consumed power P obtained in the step S8 and the predetermined time T, from the prevailing residual battery capacity Y. In a subsequent step S10, it checks for any comparison flag that is set. If a communication request has been made, a comparison flag is set in the step S6. If so, the routine goes to a step S11, in which the sub CPU 34 compares the prevailing residual battery capacity Y and the power P×Td necessary for communication, i.e., the product of the consumed power P obtained in the step S8 and the communication time Td obtained in the step S5. If it is found in the step S11 that the residual battery capacity Y is above the necessary power P×Td for communication, the sub CPU 34 informs the main CPU 30 of allowance of communication in a step S12. Otherwise, it informs the main CPU 30 of inhibition of communication because there is a possibility of battery capacity shortage during communication if the communication control is not suppressed.

Figure 4:
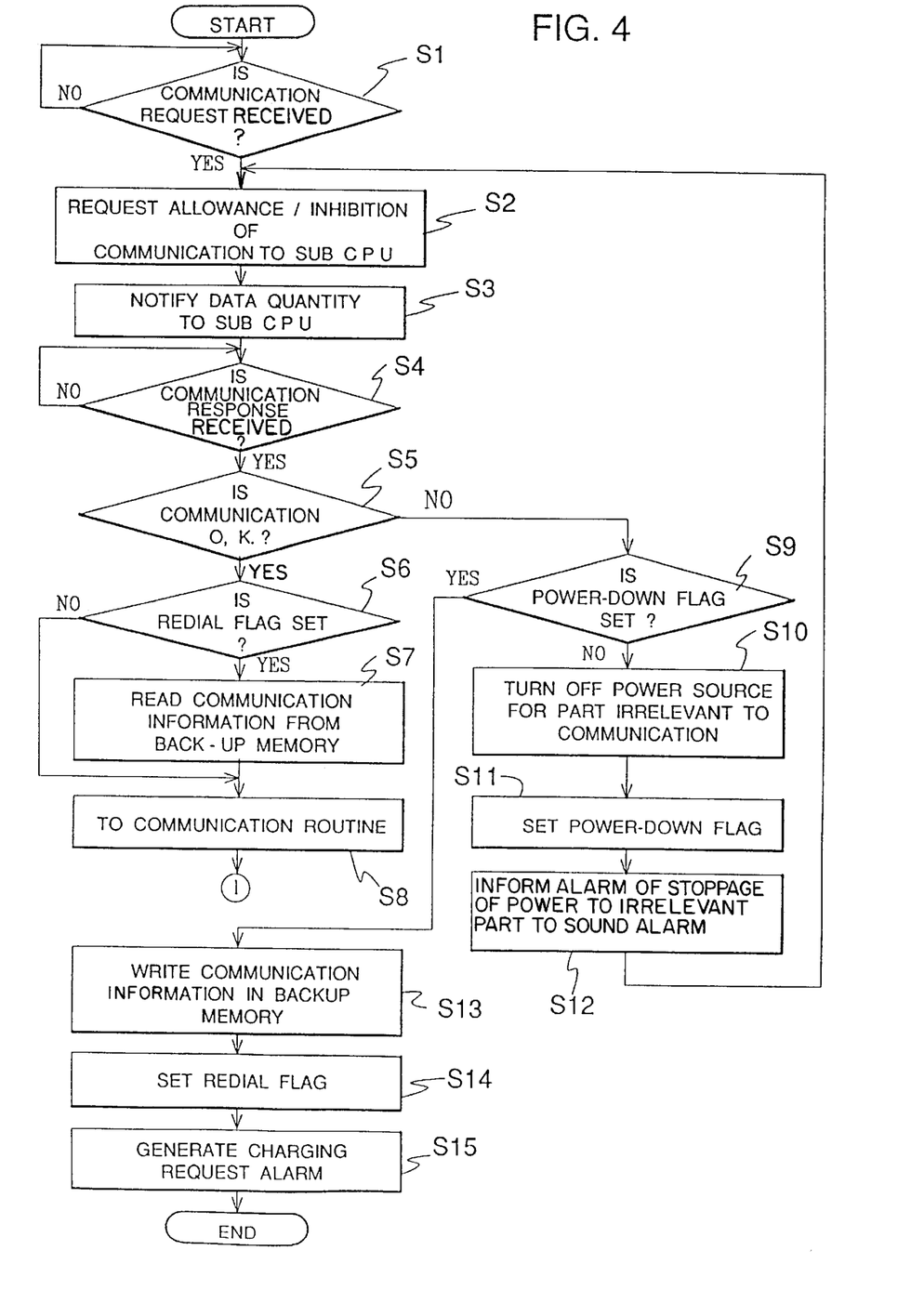
FIG. 4 is a flow chart illustrating communication control by a main CPU shown in FIG. 1 according to the invention.
Figure 5:
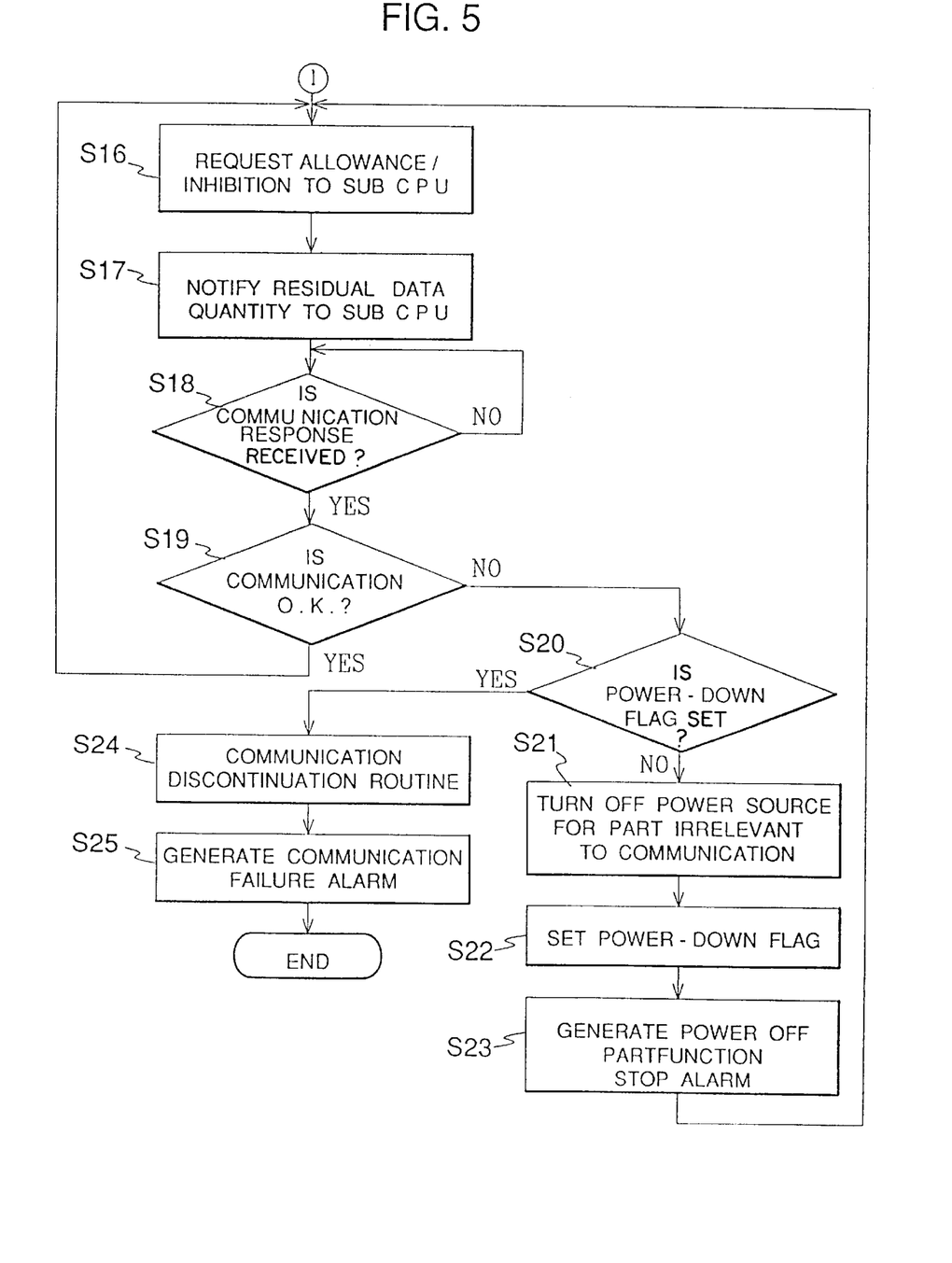
FIG. 5 is a continuation of the flow chart of FIG. 4 illustrating communication control by a main CPU shown in FIG. 1 according to the invention.

FIG. 4 is a flow chart illustrating the communication control executed by the main CPU 30 in FIG. 1, and FIG. 5 illustrates a continuation of the control. Referring to FIG. 4, in a step S1 the main CPU 30 monitors any user's communication request. If it detects a user's communication request, it executes a step S2 of requesting a check for allowance/inhibition of communication to the sub CPU 34. In a subsequent step S3, it sends a transmission data quantity to the sub CPU 34. Receiving the communication allowance/inhibition check request and the data quantity notice in the respective steps S2 and S3, the sub CPU 34 executes comparison of the detected residual battery capacity and the forecast necessary power for communication as shown in FIG. 3. In a subsequent step S4, it gives a response to the main CPU 30. In a subsequent step S5, the main CPU 30 checks for a communication allowance from the sub CPU 34. If a communication allowance is given, it executes a step S6 of checking whether a re-dial flag has been set. Since no re-dial flag was set in the initial communication stage, the routine goes to a step S8 of communication routine. Communication control based on a re-dial flag, executed in steps S6 and S7, will be described later. If the the result of the check in the step S5 is "NO", i.e., if inhibition of the communication operation is decided by the sub CPU 34 due to less residual battery capacity than the necessary power for communication, the main CPU 30 checks for a power-down flag in a step S9. Since no power-down flag has been set from the outset, it cuts power supply to the parts irrelevant to communication in a step S10. More specifically, it turns off the switch circuit 90 in the power supply controller 76 to cut power supply to the floppy disk controller 50 and external floppy disk device 94 via the power supply line 78. In a subsequent step S11, the main CPU 30 sets a power-down flag, and in a step S12 it informs the alarm generator 62 of the stoppage of power supply to and function suspension of the floppy disk controller 50 and external floppy disk device. Alarm sound is thus produced from the loudspeaker 64.

Simultaneously, the main CPU 30 causes the liquid crystal display controller 66 to display a floppy disk device function suspension message on the liquid crystal display 68 to notify the function suspension to the user. The routine then goes back to the step S2 of requesting a communication allowance/inhibition check to the sub CPU 34 and then to the step S3 of notifying the quantity of data for communication to the sub CPU 34. Receiving the check request and data quantity notification again from the the main CPU 30, the sub CPU 34 executes the check routine shown in FIG. 3. In the calculation of the consumed power P executed in the step S8 in FIG. 3, the floppy disk controller 50 and external floppy disk device 94 have their function suppressed, and the calculated consumed power P is less by an amount corresponding to the function suppression. That is, less product (P×T) is subtracted in the residual battery capacity updating in the step S9 in FIG. 3. Further, the necessary power P×Td for communication, compared with the current residual battery capacity Y in the step S11 in FIG. 3, is less than the previous value. Thus, the necessary power P×Td which previously surpassed the residual battery capacity Y is this time less due to the floppy disk device function suspension, and a communication allowance notification is issued from the sub CPU 34 in the subsequent step S12 in FIG. 3. Thus, in the step S5 in FIG. 4 the communication allowance notification is detected, and the communication routine in the steps S6 to S8 in FIG. 4 is executed.

However, if no communication allowance notification is issued from the sub CPU 34 despite the execution of the power-down process in the step S10, the routine now goes from the step S5 to the step S9. Since this time a power-down flag has been set, the routine goes to a step S13, in which the main CPU 30 writes communication control information and communication data in the back-up memory 40. Then, it sets a re-dial flag in a step S14 and generates a charging request alarm in a step S15, thus bringing an end to the routine. At this time, the alarm generator 62 causes an alarm sound to be produced from the loudspeaker 64, and at the same time the liquid crystal controller 66 causes a charging request message to be displayed on the liquid crystal display 68. Receiving the charging request alarm generated in the step S15, the user undertakes the charging of the main and sub batteries 10-1 and 10-2. When this charging is completed, a communication request is provided afresh, whereupon the routine in FIG. 4 is started.

With the communication request made after the charging request alarm, the communication allowance notification issued from the sub CPU 34 is detected in the step S5, and a re-dial flag check is done in the step S6. Since a re-dial flag has been set in the previous routine cycle, the routine goes to the step S7 of reading out the communication control information and communication data which were written in the back-up memory 40 upon the charging request alarm generation. Thus, the communication routine in the step S8 is executed without need of any user's repeated operation.

Now, a control routine during communication will be described with reference to FIG. 5. This routine is executed during communication caused with the start of the communication operation in the communication routine in the step S8 in FIG. 4. In a step S16 in FIG. 5, the main CPU 30 makes a communication allowance/inhibition check request to the sub CPU 34, and in a subsequent step S17 it notifies the prevailing residual data quantity to the sub CPU 34. Receiving the communication allowance/inhibition check request and residual data quantify notification in the steps S16 and S17, the sub CPU 34 produces a response by deciding the allowance or inhibition of communication through the detection of the residual battery capacity and forecasting and comparison of the necessary power for the communication of the residual data quantity in the flow chart of FIG. 3. The main CPU 30 checks for the response from the sub CPU 34 in a step S18 and does a communication allowance/inhibition check in a step S19. If communication allowance is given, the routine returns to the step S16, and this routine cycle is repeated until the communication is ended. If no communication allowance is obtained, the routine goes to a step S20 of power-down flag check. Since no Power-down flag has been set from the outset, the routine goes to a step S21 of cutting power supply to the parts irrelevant to communication.

Specifically, like the step S10 in FIG. 4, the main CPU 30 turns off the switch circuit 90 in the power supply controller 76 to cut power supply to the floppy disk controller 50 and external floppy device 94. Then, in a step S22 of FIG. 5 it sets a power-down flag. Then, in a step S23 it informs the user of the function suspension of the floppy disk controller 50 and external floppy disk device 94 by causing the alarm generator 62 and loudspeaker 64 to produce an alarm sound and also causing the liquid crystal display controller 66 to display a function suspension message on the liquid crystal display 68. After the function suspension of the parts irrelevant to communication by power supply cutting, the routine is returned to the step S16 of requesting a communication allowance/inhibition check to the sub CPU 34 and the subsequent step S17 of notifying the residual data quantity. The sub CPU 34 thus updates the residual battery capacity Y according to the consumed power P, which was reduced with the function suspension of the floppy disk controller 50 and external floppy disk device 94 by power supply cutting and forecasts and compares the necessary power P×Td for the communication of the residual data quantity. If a communication allowance notification response from the sub CPU 34 is detected in the step S19, the communication control is resumed. If no communication allowance notification is obtained, the routine goes to the step S20. At this time, a power-down flag has been set, and thus the routine goes to a step S24. In this step, the communication controller 52 interrupts and thus brings an abnormal end to the communication through the built-in modem 54. Also, a step S25 is executed, in which a communication failure alarm is given. That is, the alarm generator 62 and loudspeaker 64 are caused to produce an alarm sound while causing the liquid crystal display controller 66 to display a corresponding message on the liquid crystal display 68, thus bringing an end to the routine.

As shown above in the embodiment, the power supply to the parts irrelevant to communication is cut for power-down in the case of the issuance of a no communication allowance notification from the sub CPU 34. However, it is possible to obtain the power-down with function reduction in lieu of the power supply cutting. For example, it is possible to cause power-down by causing a slow-down of the operation speed with clock frequency-reduction in a system operation timing clock generator.

Further, the parts irrelevant to communication, which are the subject of function suppression for power-down, may include, for instance, an external option system connected to the option slot 74 or an external modem connected to the "RS232C" interface 46 via the connector 48 as well as the floppy disk controller 50 and external floppy disk device 94. Further, where there are a plurality of parts as the subject of power-down, it is possible to arrange things such that a communication allowance notification can be obtained with a step-wise increase of parts for power-down.

Further, while the above embodiment uses two CPUs, i.e., the main and sub CPUs 30 and 34, it is possible to employ a single high processing capacity CPU for both the judgment routine in FIG. 3 and the communication control in FIGS. 4 and 5.

Still further, while the example of FIG. 2 uses the stylus pen 72 as the user's manual input means, it is of course possible to provide a keyboard or a mouse as other input means.

Furthermore, while the RAM backed up by the sub battery 10-2 was used as the back-up memory 40, it is possible to use instead a E2 PROM which does not require any power supply back-up.

As has been described in the foregoing, it is possible to avoid communication failure during communication due to battery capacity shortage, thus dispensing with wasteful re-payment of communication fee or repeated communication operation in the event of otherwise possible communication failure. Further, in the case when the communication control is inhibited due to battery capacity shortage, the previous communication control information and communication data are stored in the back-up memory. Thus, by making a communication request afresh after battery charging, the stored data is read out from the back-up memory to automatically obtain the communication control, and it is possible to save the labor of repeating the communication routine.

What is claimed is:

1. A portable terminal comprising:
    a battery;
    a communication device supplied with drive power from said battery, to perform a communication operation;
    residual battery capacity detection means for detecting a current residual battery capacity of said battery as available power;
    judging means for calculating a first forecasting power amount necessary for the communication operation, upon receipt of a communication request including communication control information and communication data, from an amount of said communication data, for comparing the thus calculated first forecasting power amount and said current residual battery capacity detected by said residual battery capacity detection means, for starting said communication operation if said current residual battery capacity is above said first forecasting power amount, and for inhibiting start of said communication operation of said communication device if said current residual battery capacity is equal to or less than said first forecasting power amount;
    function suppressing means for suppressing or reducing functions of a group of parts irrelevant to said communication operation for a power-down state when said judging means inhibits start of a group of said communication operation, for calculating a second forecasting power amount necessary for communication from a current consumption in said power-down state, for comparing the current residual battery capacity after power-down detected by said residual battery capacity detecting means and said second forecasting power amount, for causing said communication device to start communication operation when the current of residual battery capacity is above said second forecasting power amount, and for setting redial information and then storing said communication control information and said communication data in a non-volatile memory to alarm shortage of the current residual battery capacity; and communication resuming means for calculating a third forecasting power amount necessary for communication from the amount of communication data stored in the memory when said redial information is recognized upon said power-on, for comparing the current residual amount of battery capacity detected by said residual battery capacity detecting means and said third forecasting power amount, and for resuming and normally ending a communication operation by reading out the communication control information and the remaining communication data stored in said non-volatile memory when the residual battery capacity is above said third forecasting power amount.

2. The portable terminal according to claim 1, wherein said function suppressing means suppresses or reduces the function of a floppy disk device, a display, and an option slot connector as said group of parts irrelevant to said communication operation.

3. The portable terminal according to claim 1, wherein said function suppressing means includes function suppression display means for displaying said suppressed or reduced functions of said groups of parts.

4. The portable terminal according to claim 1, further comprising alarm means for alarming the inhibition of the operation of said communication device by said judging means.

5. The portable terminal according to claim 1, wherein said residual battery capacity detection means detects the residual battery capacity by subtracting the power consumed by the terminal determined for every predetermined interval of time from the initial residual battery capacity immediately after charging of said battery.

6. The portable terminal according to claim 1, further comprising forecasting means to determine a necessary communication time by dividing the quantity of data for communication by the communication rate and forecasts the necessary power for communication by multiplying said necessary communication time by the power consumed during communication.

7. The portable terminal according to claim 6, further comprising a main CPU and a sub CPU, said main CPU executing functions of said communication device, said sub CPU executing functions of said residual battery capacity detection means, said forecasting means and said judging means.

8. A portable terminal comprising:

a battery;

a communication device supplied with drive power from said battery, to perform a communication operation;

residual battery capacity detection means for detecting, during said communication operation by said communication device, a current residual battery capacity of said battery as available power;

function suppressing means for suppressing or reducing functions of a group of parts irrelevant to said communication operation for a power-down state when a judging means inhibits start of said communication operation, for calculating a first forecasting power amount necessary for communication from a current consumption in said power-down state, for comparing the current residual battery capacity after power-down detected by said residual battery capacity detecting means and said first forecasting power amount, for causing said communication device to start said communication operation when the current residual battery capacity is above said first forecasting power amount, and for setting redial information and then storing said communication control information and said communication data in a non-volatile memory to alarm shortage of the current residual battery capacity; and communication resuming means for calculating a second forecasting power amount necessary for communication from the amount of communication data stored in the memory when said redial information is recognized upon a power-on, for comparing the current residual amount of battery capacity detected by said residual battery capacity detecting means and said second forecasting power amount, and for resuming and normally ending a communication operation by reading out the communication control information and the remaining communication data stored in said non-volatile memory when the current residual battery capacity is above said second forecasting power amount.

9. The portable terminal according to claim 8, wherein said function suppressing means includes function suppression display means for displaying said suppressed or reduced functions of said group of parts.

10. The portable terminal according to claim 8, further comprising alarm means for alarming a communication failure when the communication operation of said communication device is interrupted by said judging means.

11. The portable terminal according to claim 8, further comprising forecasting means to determine a necessary communication time by dividing the quantity of data for communication by the communication rate and forecasts the necessary power for communication by multiplying said necessary communication time by the power consumed during communication.

12. The portable terminal according to claim 11, further comprising a main CPU and a sub CPU, said main CPU executing functions of said communication device, said sub CPU executing functions of said residual battery capacity detection means, said forecasting means and said judging means.

13. A method of controlling a communication of a portable terminal based on residual battery capacity, comprising:

receiving a communication request including communication control information and communication data;

detecting a residual battery capacity as a power amount as currently available power by a battery;

calculating a first forecasting power amount necessary for communication from an amount of said communication data of said communication request;

comparing said present residual battery capacity and said first forecasting power amount and starting a communication operation when said residual battery capacity exceeds said first forecasting power amount;

inhibiting a start of the communication operation in said comparing step when said residual battery capacity is equal to or less than said first forecasting power amount;

stopping or deteriorating a function of a portion which is not concerned with the communication operation when the start of the communication operation inhibited, thereby performing a power-down state;

calculating a second forecasting power amount necessary for the communication from a current consumption in said power-down state;

comparing the present residual battery capacity and said second forecasting power amount and starting the communication operation when said residual battery capacity exceeds said second forecasting power amount;

storing, after setting redial information, said communication control information and said communication data into a non-volatile memory and alarming a lack of residual battery capacity when said residual battery capacity is equal to or less than said second forecasting power amount;

calculating a third forecasting power amount necessary for the communication from the amount of said communication data stored in said non-volatile memory when recognizing redial information upon power-on through replacement of the battery with a charged battery during power-off after said alarming;

comparing said present residual battery capacity and said third forecasting power amount; and when said residual battery capacity exceeds said third forecasting power amount, reading out said communication control information and remaining communication data stored in said non-volatile memory, starting the communication operation, and normally finishing said communication operation.

14. A method of controlling a communication of a portable terminal based on a residual battery capacity during a communication, comprising:

detecting a present residual battery capacity as a power amount as currently available power by a battery during the communication of communication data based on communication control information given by a communication request;

calculating a first forecasting power amount necessary for the communication from an amount of residual data to be communicated during the communication;

comparing said present residual battery capacity and said first forecasting power amount and continuing a communication operation when said residual battery capacity exceeds said first forecasting power amount;

interrupting the communication operation when said present residual battery capacity is equal to or less than said first forecasting power amount;

stopping or deteriorating a function of a portion which is not concerned with the communication operation when the communication operation is interrupted, thereby performing a power-down state;

calculating a second forecasting power amount necessary for the communication from a current consumption in said power-down state;

comparing the present residual battery capacity and said second forecasting power amount and restarting the communication operation when said residual battery capacity exceeds said second forecasting power amount;

storing said communication control information and said communication data in a non-volatile memory and alarming a lack of residual battery capacity when said present residual battery capacity is equal to or less than said second forecasting power amount;

storing, after setting redial information, said communication control information and said remaining communication data stored in said non-volatile memory, and alarming a lack of present residual battery capacity when said present residual battery capacity is equal to or less than said second forecasting power amount;

calculating a third forecasting power amount necessary for the communication data stored in said non-volatile memory when recognizing said redial information upon power-on through replacement of the battery with a charged battery during power-off after said alarming;

comparing said present battery capacity and said third forecasting power amount; and when said present residual battery capacity exceeds said third forecasting power amount, reading out said communication control information and the remaining communication data stored in said non-volatile memory, starting the communication operation, and normally finishing said communication operation.

* * * * *